United States Patent [19]

Levit et al.

[11] Patent Number: 4,966,672
[45] Date of Patent: Oct. 30, 1990

[54] ELECTROLYTIC APPARATUS WITH UNEQUAL LEGGED BASKET-CARRIER

[75] Inventors: Boris Levit; Michael A. C. Millerick, both of San Jose, Calif.

[73] Assignee: National Semiconductor Corporation, Santa Clara, Calif.

[21] Appl. No.: 237,520

[22] Filed: Aug. 26, 1988

[51] Int. Cl.⁵ .................. C25D 17/28; C25D 17/16; C25D 17/08; B65G 17/20
[52] U.S. Cl. .................. 204/198; 118/423; 198/465.4; 198/681; 198/799
[58] Field of Search .................. 204/202–205, 204/224, 227, 259; 118/404, 423, 429, 417, 425; 198/465.4, 681, 799; 134/48, 67, 70, 71, 73, 75, 124, 126, 127, 142

[56] References Cited

U.S. PATENT DOCUMENTS

| | | | |
|---|---|---|---|
| 483,617 | 10/1892 | Knapp | 198/799 |
| 1,360,010 | 11/1920 | Nelson | 198/799 |
| 1,775,671 | 9/1930 | Dunn | 204/202 |
| 1,876,050 | 9/1932 | Fox | 118/423 |
| 2,529,829 | 11/1950 | Banks | 198/681 |
| 2,681,015 | 6/1954 | Davis | 198/465.4 |
| 2,706,991 | 4/1955 | Pettit | 134/142 |
| 3,062,405 | 11/1962 | Le Blanc | 198/799 |
| 3,224,562 | 12/1965 | Bailey et al. | 198/465.4 |
| 4,184,927 | 1/1980 | Takahashi et al. | 204/204 |
| 4,378,281 | 3/1983 | Scanlon et al. | 204/198 |
| 4,508,611 | 4/1985 | Johnson et al. | 204/202 |
| 4,534,843 | 8/1985 | Johnson et al. | 204/202 |
| 4,668,358 | 5/1987 | Ball | 204/702 |

FOREIGN PATENT DOCUMENTS 506627 10/1954 Canada .................. 204/204

Primary Examiner—Willard Hoag

[57] ABSTRACT

An electrolytic apparatus and a material handling apparatus, including a pair of drive chains oriented to rotate in a substantially vertical plane. One or more product carriers, each including a basket portion, are supported by the chains. As the chains rotate, the product carriers are translated along a path in a substantially vertical plane. One tier of treatment tanks, or two tiers of vertically separated treatment tanks, may be positioned below the drive chains. Workpieces, such as encapsulated electronic components, may be placed within the baskets and translated by the drive chains for sequential immersion in each tank. Sprocket arrays engaged with each drive chain at positions above each tank direct the baskets first upward and then downward over the tank end walls, or over any barriers between the tanks.

24 Claims, 7 Drawing Sheets

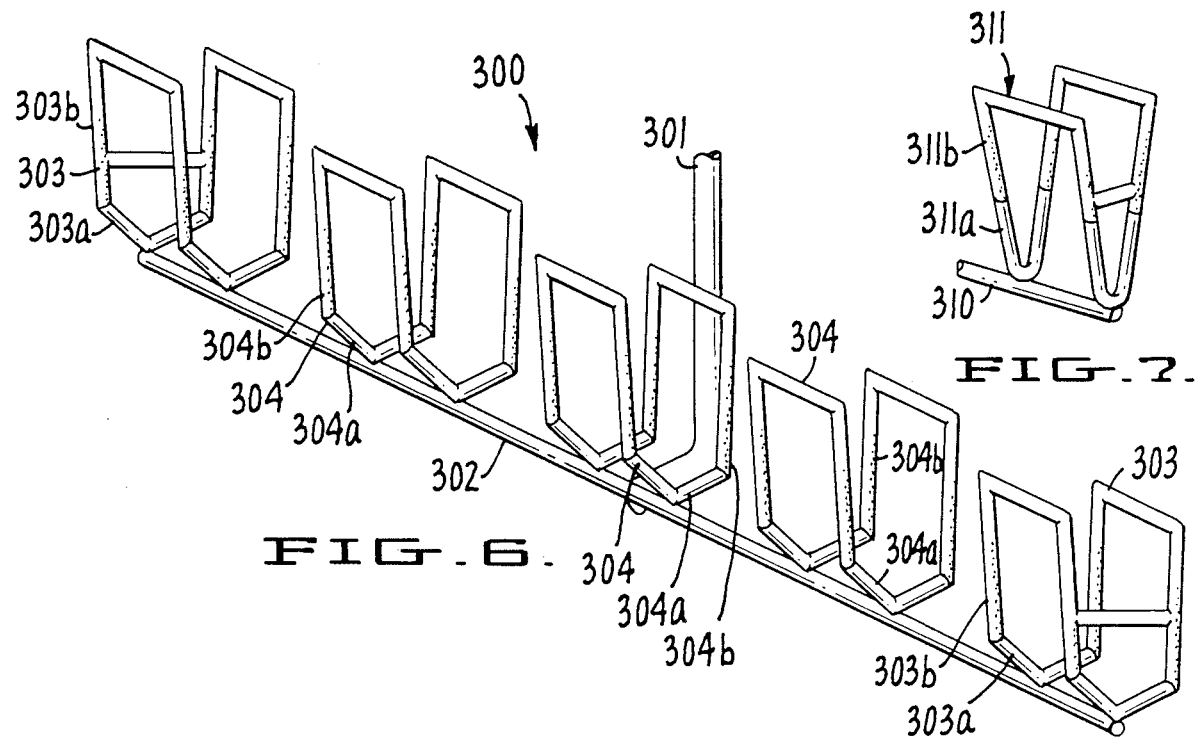
FIG. 6.
FIG. 7.
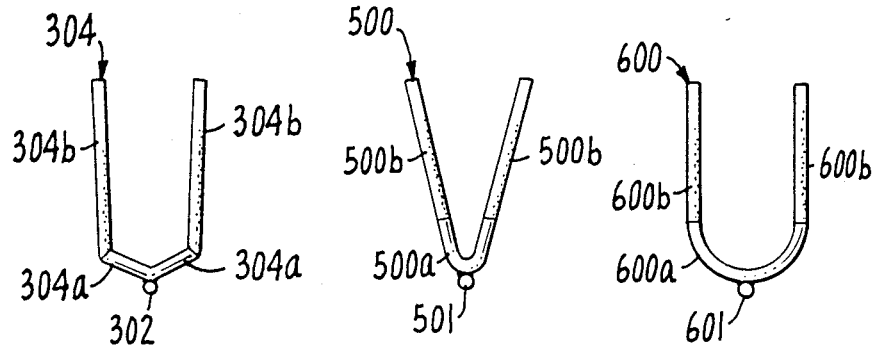
FIG. 8A.   FIG. 8B.   FIG. 8C.

ELECTROLYTIC APPARATUS WITH UNEQUAL LEGGED BASKET-CARRIER

FIELD OF THE INVENTION

This invention relates to apparatus for transporting materials along a path in a substantially vertical plane. More particularly, the invention relates to chain-driven apparatus for transporting materials along a path in a substantially vertical plane for successive treatment at two or more treatment stations.

BACKGROUND OF THE INVENTION

Numerous conventional processes require that materials be successively immersed in two or more tanks. Important examples of such processes include the electroplating and chemical treatment of electronic components, such as integrated circuit leadframes and similar components.

In the electronic component industry, discrete or integrated components are typically encapsulated in an electrically insulating material such as a plastic or ceramic package. Metal contacts or leads generally protrude from the package. These contacts or leads often require electroplating or chemical treatment after encapsulation.

It is conventional to accomplish such treatment by loading the parts onto racks or into baskets, and sequentially bathing such racks or baskets into tanks of cleansing and plating solution or the like. It is also conventional to convey the parts along a horizontal path through successive treatment stations using conveyor belts or rails.

For example, U.S. Pat. No. 4,534,843, issued Aug. 13, 1985 to Johnson, et al., discloses an electroplating apparatus having a flexible, electrically conductive conveyor belt that runs in a horizontal loop. Suitable shaped electronic components may be gripped by members attached to the bottom edge of the belt and carried along a horizontal path through successive treatment tanks. Each treatment tank has notches (weirs) at each end, allowing the components to enter and exit the tank but also allowing fluid in the tank to drain out, triggering a need for a means for collecting and recycling the escaping fluid. A complicated loading mechanism is employed to position appropriately sized and oriented components so that they may be gripped by the gripping members. In order to adapt the apparatus to transport differently sized or shaped components, the gripping members must be removed from the belt and replaced by differently sized and shaped gripping members. During electroplating operations, electric current is supplied from a power source through the entire electrically conductive conveyor belt, to the components gripped by the gripping members.

A similar conventional apparatus is disclosed in U.S. Pat. No. 4,508,611, issued Apr. 2, 1985 to Johnson, et al. The apparatus of U.S. Pat. No. 4,506,611 has a vertically oriented, electrically conductive, conveyor belt whose flat surface is oriented horizontally. The belt edges have means by which components may be attached thereto by a loading mechanism. Otherwise, the apparatus of U.S. Pat. Nos. 4,506,611 and that of 4,534,811 are similar. Both require that the treatment tanks be linearly arranged in the same horizontal plane, both require complicated loading mechanisms, and both are energy inefficient because they supply electric current that flows through the entire conveyor belt in order to supply electric current to the components engaged therewith.

Conventional material handling systems, in general, embody all or some of the following disadvantages: complexity, in the sense that extremely accurate positioning mechanisms are required for loading and unloading the components to be conveyed thereby; inability to transport parts having a wide range of shapes and sizes without system modifications; bulky size, occupying large floor areas without realizing the floor space economies attainable by maximizing the use of vertical space above a given floor area; low production rate, because the products to be treated are oriented with their longitudinal axis parallel to their travel path so that few products are processed per unit length of the product travel path; unreliability, in the sense that a percentage of the products being transported, especially delicate products such as electronic components, are damaged during the loading and unloading processes or lost during transportation along the process path; inefficient electric power usage, due to failure to limit the supply of electric power to the process areas only.

Until the present invention, it was not known how to transport materials for treatment at successive treatment stations in a manner eliminating all the mentioned disadvantages.

SUMMARY OF THE INVENTION

The inventive material handling apparatus includes a pair of drive chains (each configured as a continuous loop oriented in a substantially vertical plane), and one or more rigid members attached to the pair of drive chains. A product carrier having a basket portion is attached to each rigid member, and a product (such as an integrated circuit leadframe) is placed in each carrier basket portion. The basket portions are preferably shaped and dimensioned so that products of various types, shapes, and sizes may be placed therein. A power source rotates the drive chains so as to translate each member, carrier, and product along a path in a substantially vertical plane. One or more treatment tanks may be positioned beneath the drive chains. Sprocket arrays are positioned so as to engage with each drive chain above a wall of each tank, so as to direct each member, carrier, and product upward over the tank wall and then downward into treating fluid contained in the tank.

In one embodiment, the tanks are all positioned at substantially the same vertical level. In a preferred embodiment, one tier of tanks is positioned above (or below) a second tier of tanks, so that the drive chains translate the products first generally horizontally through the first tier of tanks, then upward (or downward) to a different vertical level, and then generally horizontally through the second tier of tanks.

In order to electroplate the products, or portions thereof (such as integrated circuit leadframes), each carrier has an electrically conductive portion on which the product may rest. An electric power source provides current that flows to the product through the carrier only at desired time intervals such as when a product (or the appropriate portion thereof) is immersed in the appropriate tank. The inventive apparatus preferably includes insulating portions that prevents the flow of electroplating current except through a compact portion of the apparatus between the electric power source and the immersed product.

In a preferred embodiment, the rigid member driven by the drive chains comprises two L-shaped portions, each attached to one of the drive chains, and a product carrier attached between the L-shaped portions. The product carrier is stamped from a flat metal sheet and bent into a basket shape.

In an alternative embodiment, the rigid member is an L-shaped bar, having a vertical bar portion attached to one drive chain and a horizontal bar portion attached to the other drive chain. The product carrier comprises a vertical rod attached to the horizontal bar portion and a basket portion suspended from the vertical rod. In this embodiment, the L-shaped bar kinematically prevents the carriers from swinging. In variations on this embodiment, the rigid member is a horizontally oriented straight bar (or rod).

BRIEF DESCRIPTION OF THE DRAWINGS

FIG. 6 is an enlarged, perspective view of an alternative embodiment of the product carrier of the invention.

FIG. 7 is a perspective view of an end portion of another alternative embodiment of the product carrier of the invention.

FIG. 8A–8C are cross-sectional views of three alternative embodiments of the product carrier of the invention.

DETAILED DESCRIPTION OF THE PREFERRED EMBODIMENTS

Figure 1:
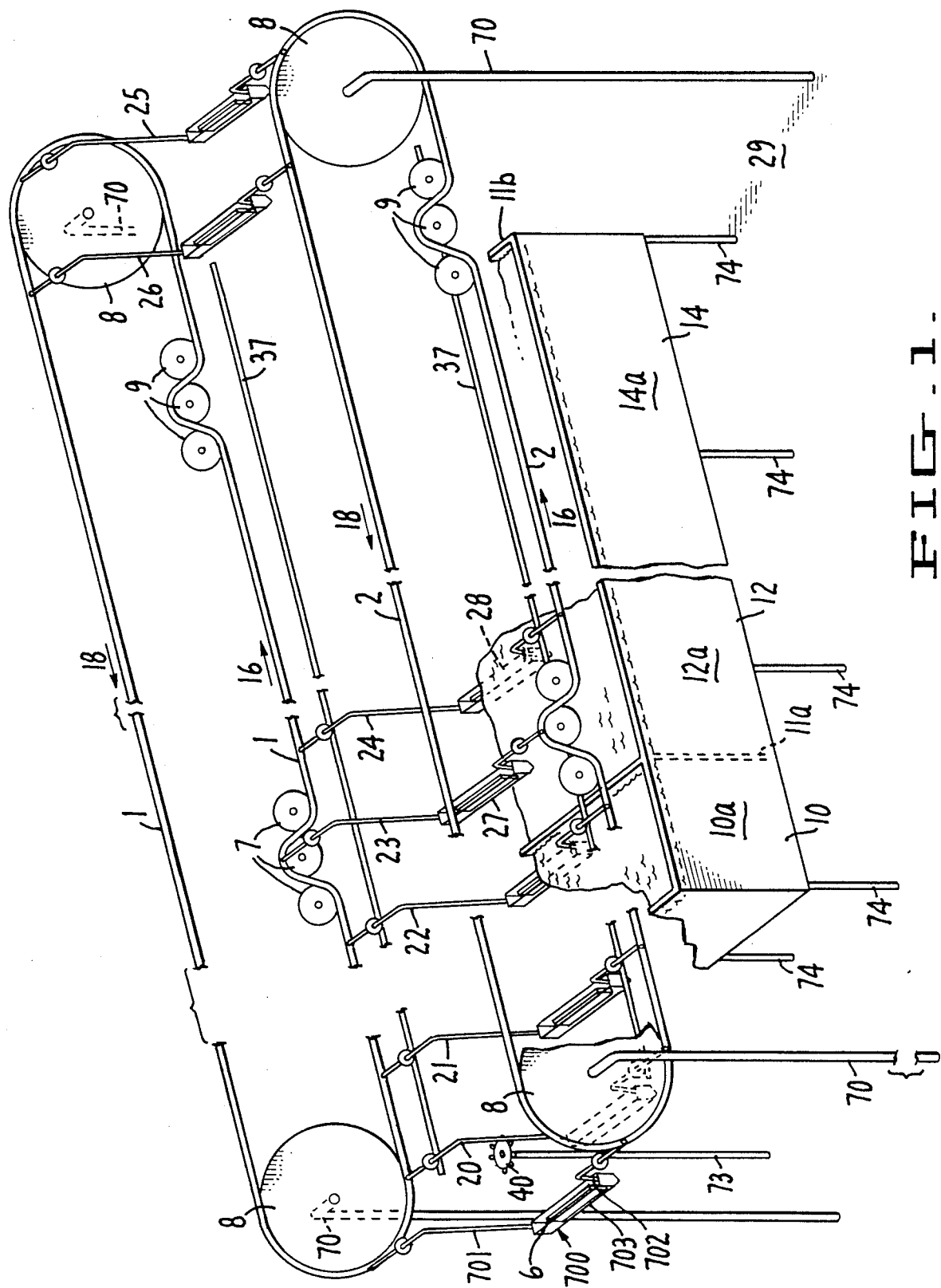
FIG. 1 is a simplified perspective view of a preferred embodiment of the inventive apparatus.

A preferred embodiment of the invention will be described with reference to FIGS. 1 and 2. FIG. 1 is a simplified perspective view of this embodiment. Drive chains 1 and 2 are each oriented in a substantially vertical plane. Each is driven in a substantially vertical path by drive sprockets 8, which may be powered by a conventional power source (not illustrated), and which are dimensioned to engage the links of chains 1 and 2. Product carrier 700 is attached between chains 1 and 2. Part 6, which may be an encapsulated electronic component, rests in basket portion 703 of carrier 700. Any number of additional product carriers identical to carrier 700 may be attached between chains 1 and 2, each for supporting a part (such as an encapsulated electronic component) identical to or different from part 6. Carriers 20–26 are simplified representations of seven such additional carriers. Part 27 rests in carrier 23, and part 28 rests in carrier 24.

Central portion 703 of product carrier 700 (shown in greater detail in FIG. 2) is preferably stamped from a flat sheet of metal and then bent into a basket shape. L-shaped rods 701 and 702 suspend portion 703 from drive chains 1 and 2. Chains 1 and 2 may be spaced vertically (as shown) or alternatively may be positioned at the same vertical level. Because chains 1 and 2 are spaced vertically in FIG. 1, the vertical portions of rods 701 and 702 have unequal length so as to suspend portion 703 generally horizontally.

As the drivers (drive sprockets 8) rotate chains 1 and 2 at the same rotational speed, each of carriers 700 and carriers 20 through 26 is translated along a path in a substantially vertical plane. Part 6 will initially translate parallel to the direction of arrows 16 and later will translate parallel to the direction of arrows 18, as drive sprockets 8 rotate counterclockwise.

Treatment tanks 10, 12, and 14, containing fluids 10a, 12a and 14a, respectively, are separated by walls such as wall 11d positioned below drive chains 1 and 2. When the basket portion containing part 27 approaches a wall (such as wall 11a), it is directed first upward over the wall and then downward so as to be at least partially immersed in the fluid (for example, fluid 12a) in the next tank (for example, tank 12), provided there is a fluid containing tank in the proper position. When the basket approaches end wall 11b, it is directed upward over the end wall and then downward outside the tank bounded by the end wall.

A pair of sprocket arrays 7 (one sprocket array 7 for each drive chain) above wall 11a direct the drive chains first upward and then downward, as they rotate, to direct the carrier assemblies translating past arrays 7 (such as carrier 24 supporting part 28) over wall 11a. The last pair of sprocket arrays 9 disposed above end wall 11b serves a similar function as does the first pair of arrays 7.

Drive sprockets 8 are held above floor 29 by support means 70. Tanks 10, 12 and 14 are supported above floor 29 by support means 74. Stabilizing chains 37 (to be discussed below with reference to FIG. 2) are supported by conventional means (not shown) above floor 29. Pinned wheel 40 (to be discussed below with reference to FIG. 2) is supported above floor 29 by support means 73. The sprockets comprising sprocket arrays 7, 9, and other similar sprocket arrays disposed therebetween (but not shown in FIG. 1) are similarly supported above floor 29 by support means (not shown in FIG. 1).

Figure 2:
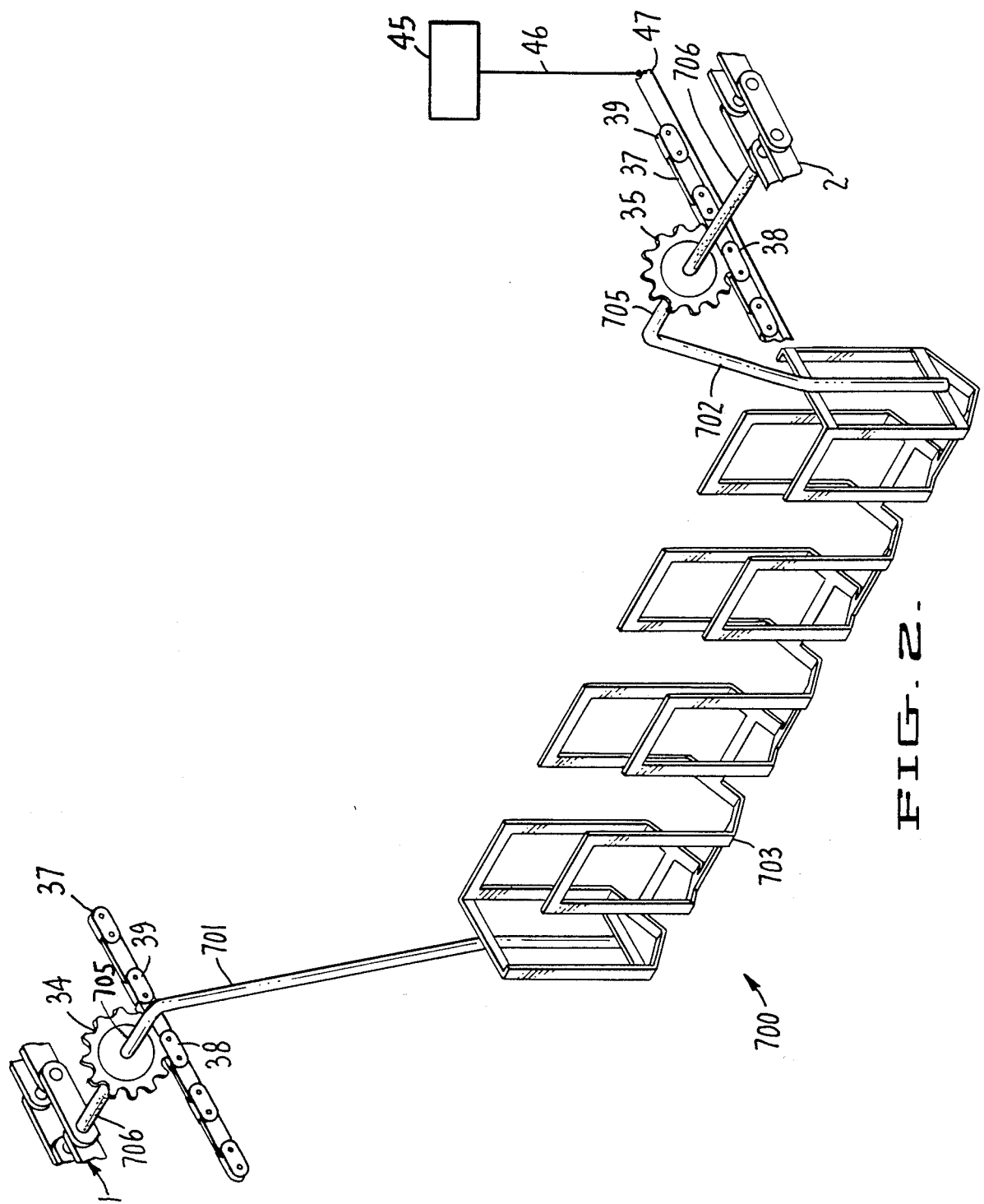
FIG. 2 is a perspective view of a portion of the apparatus of FIG. 1, showing in more detail the chain drive elements of the inventive apparatus.

FIG. 2 is a more detailed view of a portion of the apparatus of FIG. 1. Stabilizing sprockets 34 and 35 of FIG. 2, rotatably attached between horizontal sections 705 and 706 of L-shaped members 702 and 701 respectively, are guided by stabilizing chains 37. Each outer horizontal portion 706 is electrically insulating, and each inner horizontal portion 705 is electrically conducting. Each stabilizing chain 37 serves to stabilize basket portion 703. At least the lower one of chains 37 permits electric current to flow from bus bar 47, through chain 37, inner portion of member 702 (but not outer horizontal portion 706 of member 702), and conductive portion of basket 703, to a part (not shown in FIG. 2), such as part 6 of FIG. 1, resting in basket 703. In variations on the embodiment shown in FIG. 2, the upper one of chains 37, or both of chains 37, may be connected to bus bar 47 (or to one or more similar bus bars), for supplying current to the conductive portion of basket 703 and any part resting therein. Provision of electrical current to a part resting in basket 703 is desirable, for example, to permit the part to be electroplated in a tank containing an appropriate solution. The necessary electric power for electroplating is supplied by power source 45 through cable 46 to the appropriate one or both of chains 37. In an electroplating operation, one pole of source 45 is connected to cable 46 to cause bus bar 47, one or both of chains 37, and basket 703 to serve as a cathode, and the other pole of source 45 is connected to an anode (not shown) immersed in the electroplating solution.

Preferably at least one of chains 37 has two or more insulating links such as links 39, bus bar 47 (on which said at least one chain 37 rests) is a nickel plated copper bus bar, cable 46 is in direct electrical contact with bus bar 47, and bus bar 47 is in direct electrical contact with the electrically conductive links (such as links 38) of each stabilizing chain 37 resting thereon. This arrangement enhances the energy efficiency of the system by restricting electric current flow to that electrically conductive portion of each stabilizing chain 37 in contact with one or both of sprockets 34 and 35. If necessary to provide continuous electric contact as the parts move through a number of electroplating tanks, several bus bars of the same type as bus bar 47 are attached to electric cables, such as cable 46, in turn attached to electric power source 45 (or to a different electric power source). Each such bus bar is positioned in contact with one or both of chains 37 at a selected position (such as above an electroplating tank) so that current is drawn from the power source, through the electric cables to the bus bars only at desired time intervals, such as when part 6 is immersed in an appropriate electroplating treatment tank.

Figure 3:
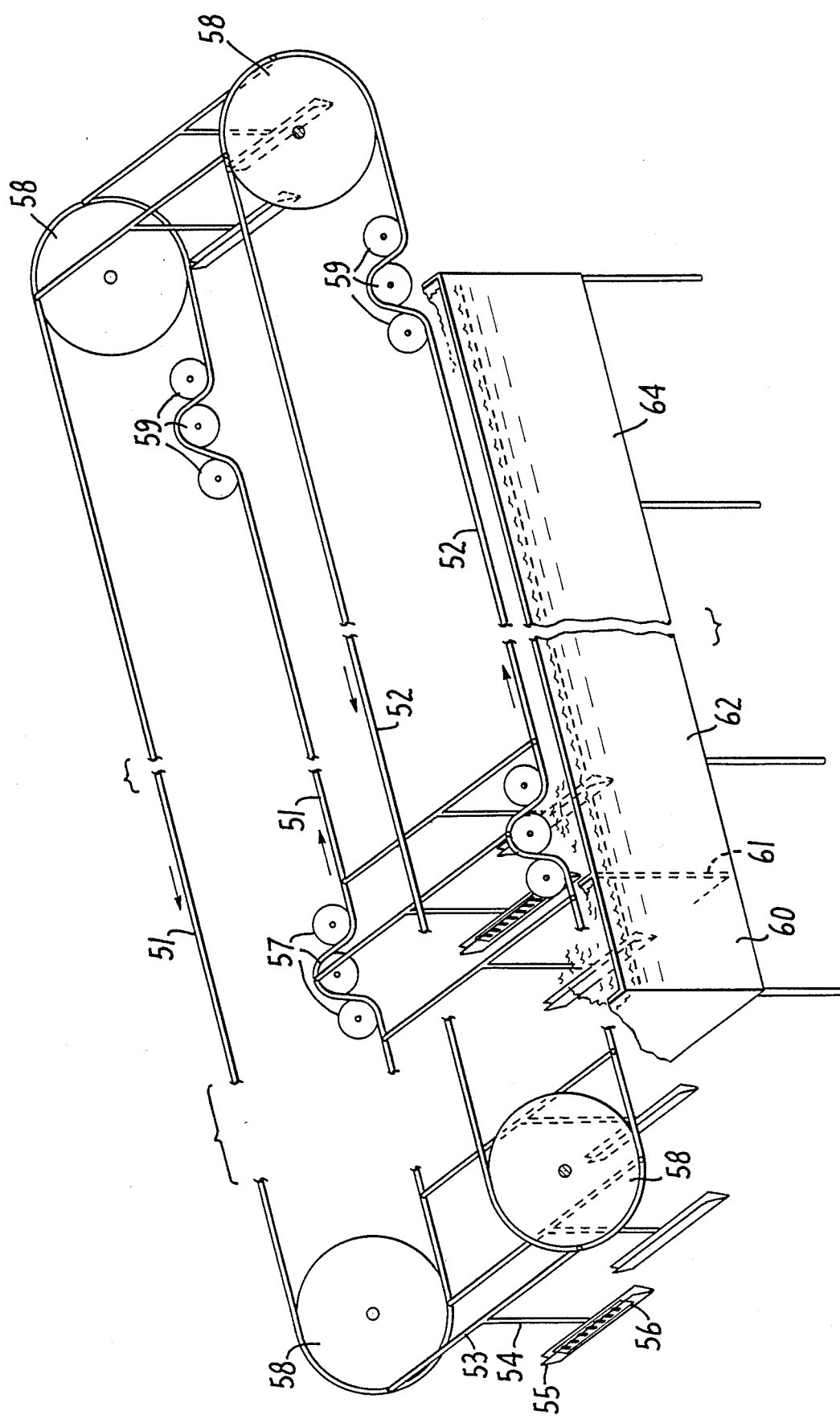
FIG. 3 is a simplified perspective view of an alternative embodiment of the inventive apparatus.

FIG. 3 is a simplified perspective view of an alternative embodiment of the invention. Drive chains 51 and 52, sprocket arrays 57 and 59, and tanks 60, 62 and 64 correspond respectively to chains 1 and 2, sprocket arrays 7 and 9, and tanks 10, 12 and 14 in the FIG. 1 embodiment. Member 53, rod 54, and basket 55 are an alternative embodiment of product carrier 700 of the FIG. 1 embodiment. Chains 51 and 52 are positioned at substantially the same vertical level, and member 53 is a horizontally oriented straight bar (or rod) for suspending basket 55 below chains 51 and 52. In contrast, chains 1 and 2 are vertically spaced in the FIG. 1 embodiment.

The material handling systems of FIGS. 1 and 3 operate identically, except that in the FIG. 1 embodiment the L-shape of portions 701 and 702 kinematically prevents basket 703 from excessive swinging motion, while in the FIG. 3 embodiment, the rotational freedom of bar 53 relative to chains 51 and 52 permits rod 54 and basket 55 to swing, except as such swinging is limited by gravitational and frictional forces.

Figure 4:
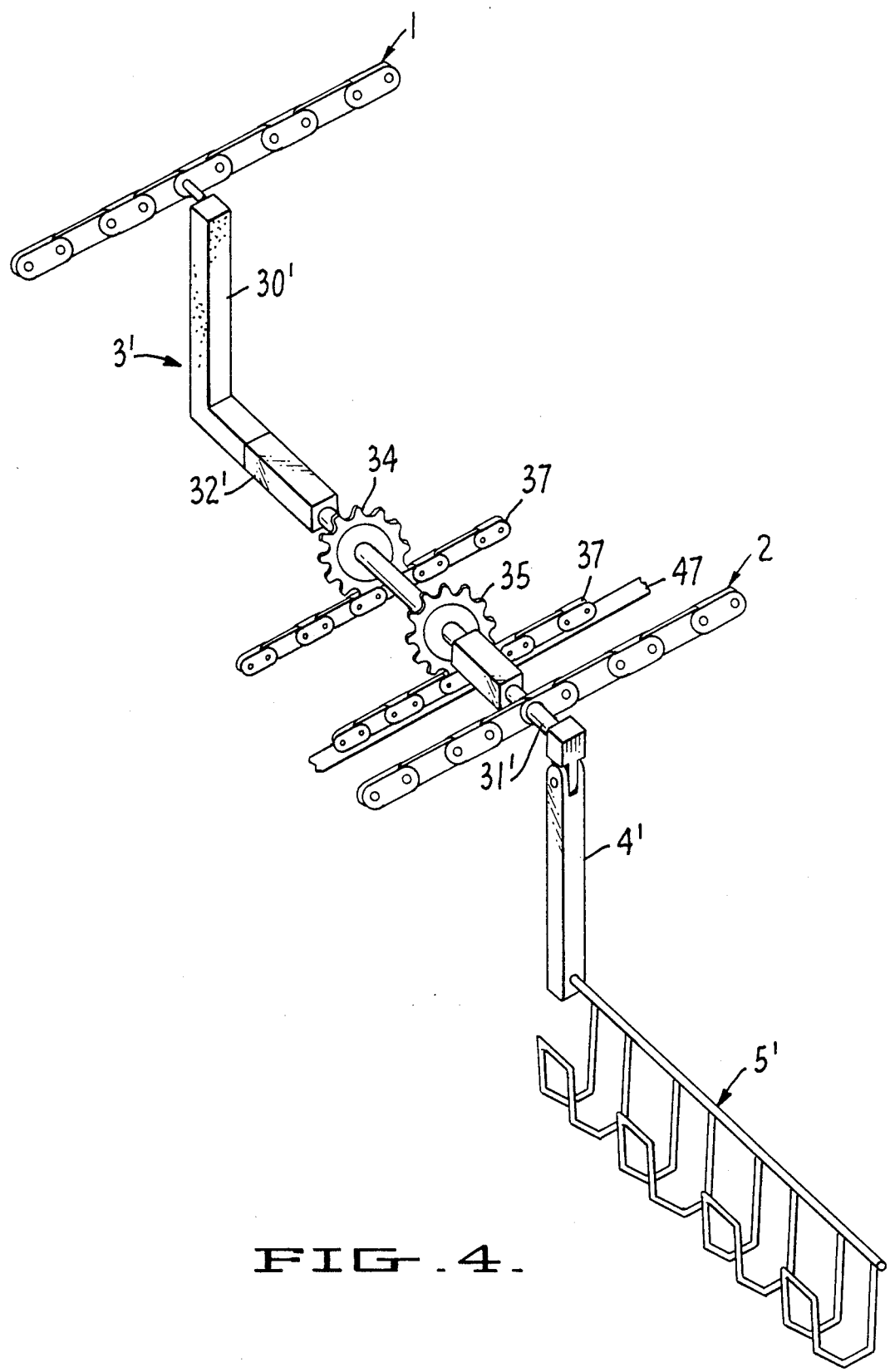
FIG. 4 is a perspective view of an alternative embodiment of the invention.

FIG. 4 is a portion of another alternative embodiment of the system of the invention, in which the basket portion of the product carrier positioned outside drive chains 1 and 2 (rather than between the drive chains). Basket 5' and electrically conducting member 4' are pivotally attached to L-shaped member 3' by hinge 31'. Member 3' includes L-shaped, electrically insulating portion 30' and horizontal, electrically conducting portion 32'. Portion 4' may rotate or pivot about hinge 31' so that portion 4' (and basket 5' rigidly attached thereto) may have a variety of orientations, including vertical and horizontal orientations. Sprockets 34 and 35 are rotatably attached to portion 32' as in the FIG. 2 embodiment. Sprockets 34 and 35 are guided by stabilizing chains 37, one or both of which may rest on a bus bar such as bus bar 47. Basket 5' may be rotated about hinge 31' upward out of an electroplating tank for easy replacement of an anode in the tank.

All other components of the FIG. 1 system, including sprockets 7 and 9, are included in the FIG. 4 embodiment but are not shown in FIG. 4.

Figure 5:
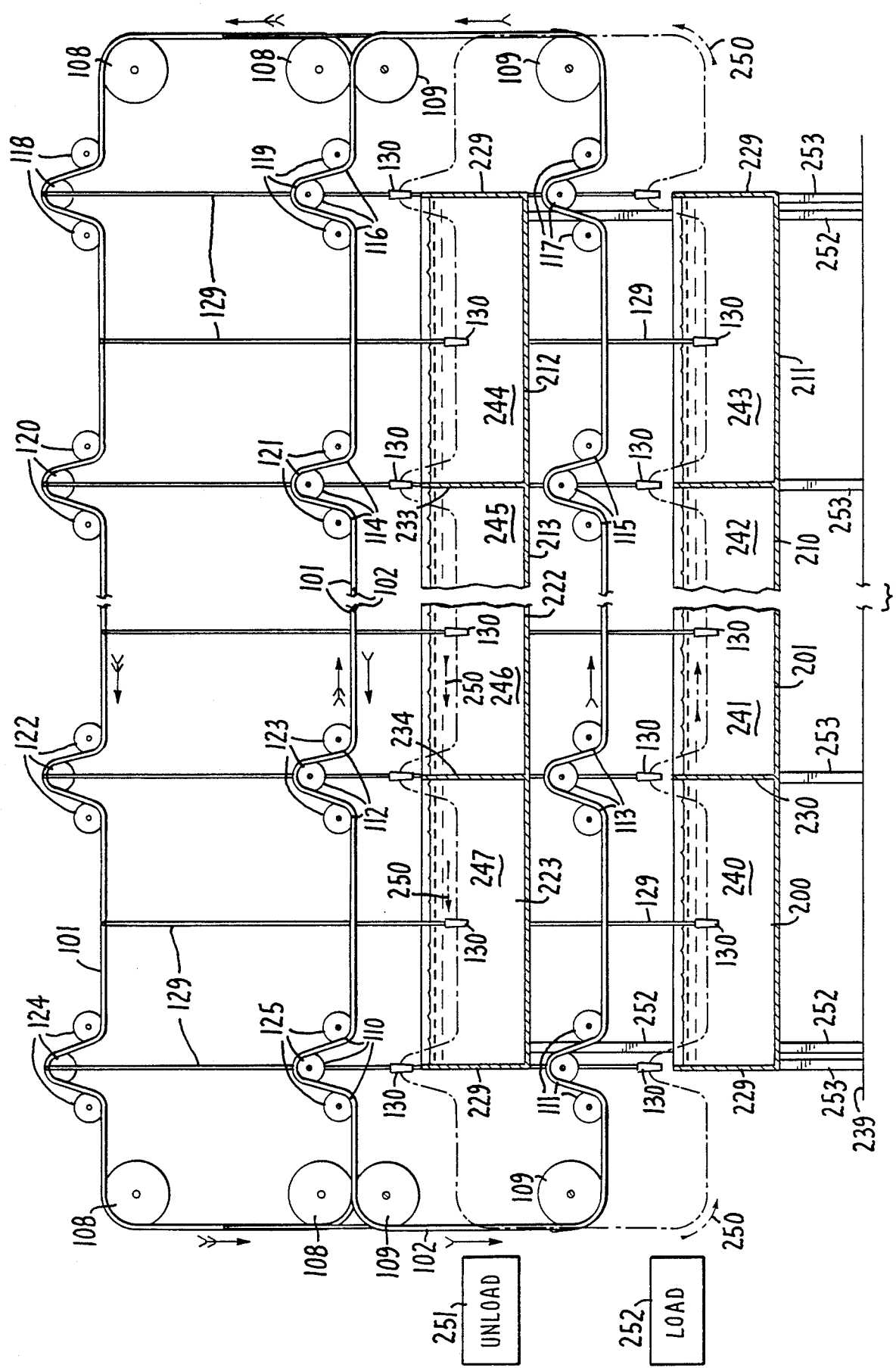
FIG. 5 is a simplified side elevational view of another preferred embodiment of the inventive apparatus, in which the products are treated in two, vertically spaced tiers of tanks.

FIG. 5 is a simplified side elevational view of another preferred embodiment of the invention. The FIG. 5 apparatus is a two-tiered variation on the FIG. 1 apparatus, and includes one or more L-shaped support members (similar to member 3 shown in FIG. 9) attached between drive chains 101 and 102. Each support member includes a vertical rod portion 129. Drive chain 101 is driven by drive sprockets 108. Drive chain 102 is driven by drive sprockets 109. Sprockets 109 and chain 102 are disposed above the plane of FIG. 5, and if the plane of FIG. 5 represents the plane midway between chains 101 and 102, then sprockets 108 are disposed below the plane of FIG. 5. Thus, rods 129 are drawn so as to indicate that rods 129 hang in a vertical plane behind the plane of (i.e., into the page with respect to) chain 102 and sprocket 109.

A lower tier of tanks 200, 201, 210 and 211 is supported above floor 239 by support members 253. An upper tier of tanks, including tanks 212, 213, 222 and 223 is supported above tanks 200, 201, 210 and 211 by taller support members 252. Support members 252 and 253 are positioned away from the path of baskets 130 and rods 129, so as not to obstruct translation of these baskets and rods. Any number of tanks may be included in the lower tier and any number may be included in the upper tier. Tanks 200, 201, 210, 211, 212, 213, 222 and 223 contain fluids 240, 241, 242, 243, 244, 245, 246 and 247 respectively. Barrier 230 separates tanks 200 and 201, barrier 231 separates tanks 210 and 211, barrier 233 separates tanks 212 and 213, and barrier 234 separates tanks 222 and 223. End walls 229 define the ends of each tier of tanks.

As drive chains 101 and 102 rotate counterclockwise at the same rotational speed, baskets 130 (each of which hangs below a rod 129) pass sequentially through tanks 200-223. Parts (such as electronic components) may be placed into baskets 130 at loading station 252 prior to treatment in the tanks, and then removed from baskets 130 at unloading station 251 after treatment in the tanks. Stations 251 and 252 may be located at any desired location relative to the tanks.

Sprocket arrays 111, 113, 115, 117, 119, 121, 123 and 125 are engaged with chain 102. Sprocket arrays 110, 112, 114, 116, 118, 120, 122 and 124 are engaged with chain 101. Thus, the sprocket arrays engaged With chain 102 lie in the vertical plane of chain 102 (above the plane midway between the chains 101 and 102) and the sprocket arrays engaged with chain 101 lie in a vertical plane beneath the plane of the sprocket arrays engaged with chain 102. Sprocket arrays 110, 112, 114 and 116 lie directly beneath (and are obscured by) sprocket arrays 125, 123, 121 and 119 respectively. Similarly, the portion of chain 101 spanned by arrays 110 and 116 lies directly beneath (and is obscured by) the portion of chain 102 spanned by arrays 119 and 125.

As in the FIG. 1 embodiment, sprocket arrays 110 and 111 direct drive chains 101 and 102 upward and then downward, thus directing basket 130, as it passes below arrays 110 and 111, so as to clear end wall 229 of tank 200. Similarly arrays 112 and 113 direct the basket therebelow first upward and then downward, so as to avoid barrier 230 which separates tanks 200 and 201. Also in the same manner, arrays 120 and 121 direct the basket therebelow upward and then downward to avoid barrier 233.

Arrows 250 indicate the path ("path 250") along which each basket 130 translates as chains 101 and 102 rotate. Path 250 lies in a substantially vertical plane.

The configuration of the FIG. 5 embodiment is particularly advantageous because it minimizes the area of floor 240 occupied by the apparatus for a given number of treatment tanks. In contrast, the FIG. 1 embodiment would occupy more floor space to accommodate all of tanks 200–223, since the tanks would all be positioned end-to-end along a horizontal line on the floor in the FIG. 1 embodiment.

FIGS. 6, 7, and 8A–8C are enlarged views of baskets (which are also referred to herein as "basket portions" of "product carriers") suitable for use as part of any of the FIG. 1, the FIG. 3, the FIG. 4, or the FIG. 5 embodiments of the inventive apparatus.

Basket 300 of FIG. 6 is attached at the end of rod 301. The other end of rod 301 is attached to a rigid member (such as member 54 of FIG. 3) driven by the drive chain pair of the invention. Basket 300 is made of metal wire, and includes wire rod 302, end pieces 303 and central pieces 304. Pieces 303 and 304 are desirably spaced from each other to permit easy insertion and removal of workpieces (such as electronic components) in the basket. FIG. 8a is a cross-sectional view of piece 304 taken in a plane perpendicular to the axis of rod 302. For some applications, it is desirable that basket 300 be given an electrically insulating coating. For electroplating applications, it is preferable that upper portions 303b and 304b of pieces 303 and 304, respectively, be given an electrically insulating coating but that lower portions 303a and 304a be left uncoated. The exposed metal surfaces of portions 303a and 304a will then provide electrical contact between rod 301 (attached directly to rod 302) and a component resting (in basket 300) against portion 303a or 304a or both portions 303a and 304a.

In embodiments of the type shown in FIG. 1 or FIG. 4, a support member would be attached to either one or both of the end pieces 303 and 304 of basket, 300, in place of rod 301 (shown attached to the central portion of basket 300 in FIG. 6).

FIG. 7 is an alternative embodiment of an end piece of the basket of FIG. 6. For electroplating applications, lower portion 311a consists of bare metal wire, while upper portion 311b is preferably given an electrically insulating coating. FIGS. 8b and 8c are cross-sectional views of end and central pieces that are substitutable for the end and central pieces of basket 300. For electroplating applications, lower portion 500a of the FIG. 8b unit, and lower portion 600a of the FIG. 8c unit are bare metal wire, while upper portions 500b and 600b are wire having an electrically insulating coating.

Figure 9:
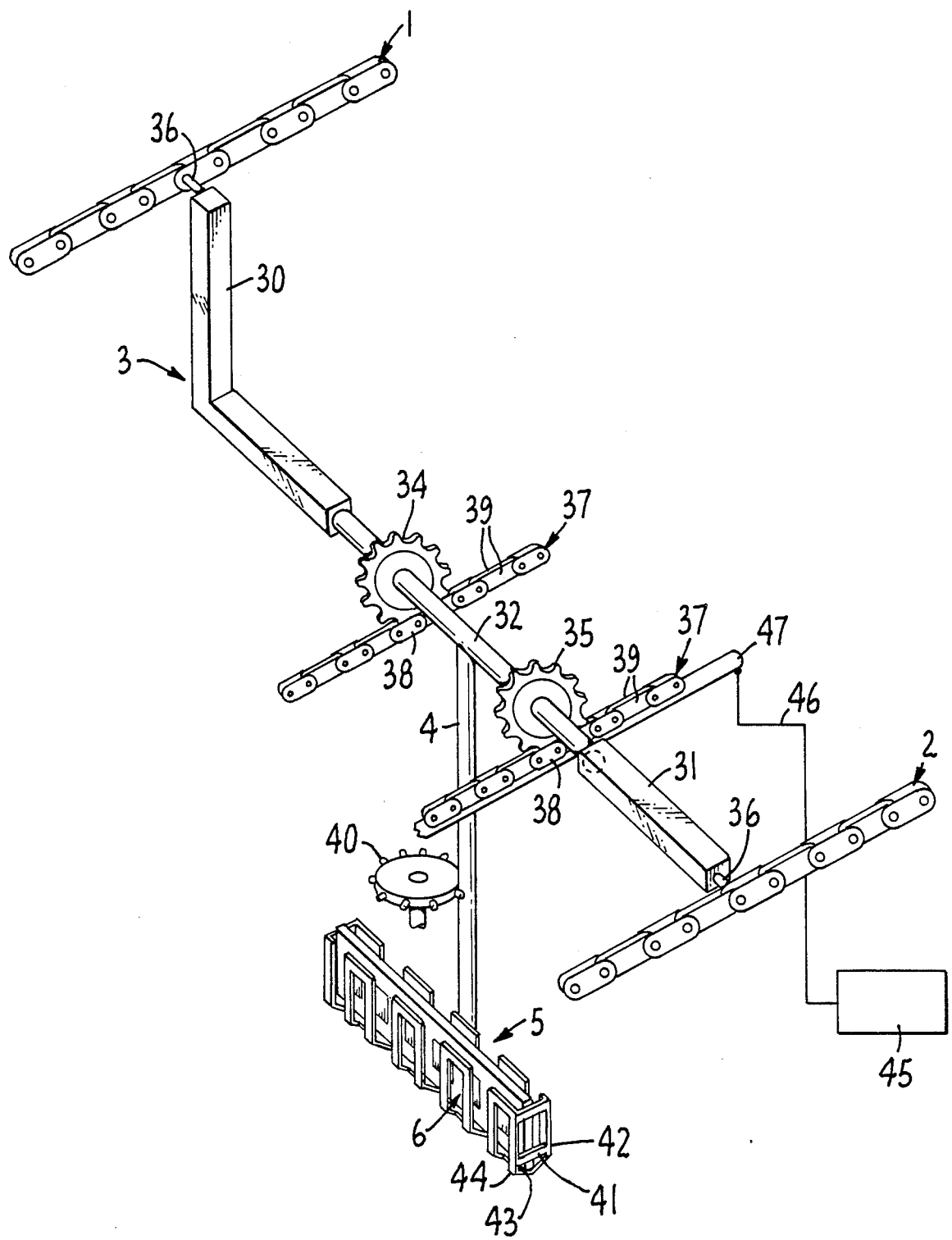
FIG. 9 is an enlarged, perspective view of a portion of an alternative embodiment of the invention.

FIG. 9 is an alternative embodiment of a product carrier suitable for use as a substitute for the carriers of the embodiment described with reference to FIGS. 1 and 2. The FIG. 9 carrier includes an L-shaped rigid member 3 supported between chains 1 and 2. Carrier rod 4 extends downward from central portion 32 of rigid member 3 to support basket 5. Member 3 includes electrically insulating outer portions 30 and 31, and electrically conductive central portion 32 attached to rod 4, for example by a weld. Portions 30 and 31 may be formed of plastic, and portion 32 and rod 4 may be composed of stainless steel or another metal. Portions 30 and 31 are rotatably attached to chains 1 and 2, respectively, such as by pin units 36. Rod 4 is attached to electrically conductive wire rod 44 (a component of basket 5), for example by a weld.

In a similar manner to the FIG. 2 embodiment, sprockets 34 and 35 are rotatably attached to central portion 32, and stabilizing chains 37 are provided for guiding stabilizing sprockets 34 and 35. Each stabilizing chain 37 serves to stabilize basket 5, and at least one of chains 37 permits electric current to flow from bus bar 47, through said at least one of chains 37, central portion 32, rod 4, and the conductive portion of basket 5, to part 6 resting in basket 5. The necessary electric power for electroplating operations is supplied by power source 45 through cable 46 to at least one of chains 37.

Wheel 40 (or a similar spacing mechanism) having teeth (or pins) may be positioned so that the teeth (or pins) will engage with the rods (for example rod 4), to ensure even spacing of baskets 5, and to ensure that the parts being treated (for example part 6) will be positively placed in or removed from the baskets when desired.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A material handling apparatus, including:
   (a) a first drive chain oriented in a substantially vertical plane;
   (b) a second drive chain oriented in a substantially vertical plane, and vertically offset from the first drive chain;
   (c) a first rigid L-shaped bar, having a substantially vertical portion attached to the first drive chain and a substantially horizontal portion attached to the second drive chain; and
   (d) a first carrier having a first basket portion for receiving a first part, said first carrier being attached to the first rigid L-shaped bar, wherein the first drive chain and the second drive chain are capable of rotating so as to translate the first rigid L-shaped bar, the first carrier, and the first part along a path in a substantially vertical plane, wherein the path includes a pair of vertically offset, generally horizontal elongated portions.

2. The apparatus of claim 1, also including
   (e) a second rigid L-shaped bar having a first portion attached to the first drive chain and a second portion attached to the second drive chain; and
   (f) a second carrier, having a second basket portion for receiving a second part, said second carrier being attached to the second rigid L-shaped bar, wherein the first drive chain and the second drive chain are capable of rotating so as to translate the second rigid L-shaped bar, the second carrier, and the second part along the path.

3. A material handling apparatus, including:
   (a) a first drive chain oriented in a substantially vertical plane;
   (b) a second drive chain oriented in a substantially vertical plane, and vertically offset from the first drive chain;
   (c) an L-shaped member, having a substantially vertical portion attached to the first drive chain and a substantially horizontal portion attached to the second drive chain;
   (d) a carrier having a basket portion for receiving a part, said carrier being attached to the L-shaped member, wherein the first drive chain and the second drive chain are capable of rotating so as to translate the L-shaped member, the carrier, and the part along a path in a substantially vertical plane, wherein the path includes a pair of vertically offset, generally horizontal elongated portions, and (e) a first pair of sprocket arrays, each sprocket array in the first pair being associated with a different one of the drive chains, and each sprocket array in the first pair being positioned so as to direct the associated drive chains first upward and then downward along a first deviated chain path portion as the drive chains translate past the first pair of sprocket arrays.

4. The apparatus of claim 3, also including a second pair of sprocket arrays, each sprocket array in the second pair being associated with a different one of the drive chains, and each sprocket array in the second pair being positioned so as to direct the drive chains first upward and then downward along a second deviated chain path portion as the drive chains translate past the second pair of sprocket arrays.

5. The apparatus of claim 4, wherein the first pair of sprocket arrays is vertically spaced from the second pair of sprocket arrays, so that the first deviated chain path portion is vertically spaced from the second deviated chain path portion.

6. A material handling apparatus, including:
a first drive chain oriented in a substantially vertical chain;
a second drive chain oriented in a substantially vertical chain, and vertically offset from the first drive chain;
an L-shaped bar, having a first substantially vertical portion attached to the first drive chain and a second substantially horizontal portion attached to the second drive chain, wherein the L-shaped bar has an electrically conductive central portion;
a first carrier having a first basket portion for receiving a first part and an electrically conductive portion electrically connecting the central portion of the L-shaped bar and the first part when the first part rests in the first basket portion, said first carrier being attached to the L-shaped bar, wherein the first drive chain and the second drive chain are capable of rotating so as to translate the L-shaped bar, the first carrier, and the first part along a path in a substantially vertical plane, wherein the path includes a pair of vertically offset, generally horizontal elongated portions;
at least one electrically conductive stabilizing sprocket attached to the central portion of the L-shaped bar;
a third chain for stabilizing the L-shaped bar, and engaged with said at least one stabilizing sprocket; and
an electrical power source coupled to the third chain and capable of causing electric current to flow from the electric power source through at least a portion of the third chain, and through said at least one stabilizing sprocket, the central portion of the L-shaped bar, and the electrically conductive portion of the first carrier, to the first part when the first part rests in the first basket portion.

7. The apparatus of claim 6, also including an electrically conductive bus bar on which the third chain rests, wherein the electric power source is connected to the bus bar, and wherein the third chain comprises at least one electrically insulating link and a plurality of electrically conductive links, so that when one of the electrically conductive links of the third chain is in contact with said at least one stabilizing sprocket, electric current may flow from the electric power source to the bus bar and the first part through only a portion of the third chain.

8. A material handling apparatus, including;
a first drive chain oriented in a substantially vertical plane;
a second drive chain oriented in a substantially vertical plane, and vertically offset from the first drive chain;
a first L-shaped bar, having a first substantially vertical portion attached to the first drive chain and a second substantially horizontal portion attached to the second drive chain;
a first carrier having a first basket portion for receiving a first part, said first carrier being attached to the first L-shaped bar, wherein the first drive chain and the second drive chain are capable of rotating so as to translate the first L-shaped bar, the first carrier, and the first part along a path in a substantially vertical plane, wherein the path includes a pair of vertically offset, generally horizontal elongated portions;
a second L-shaped bar having a first portion attached to the first drive chain and a second portion attached to the second drive chain;
a second carrier, having a second basket portion for receiving a second part, said second carrier being attached to the second L-shaped bar, wherein the first drive chain and the second drive chain are capable of rotating so as to translate the second L-shaped bar, the second carrier, and the second part along the path; and
a spacing mechanism positioned so as to engage each carrier along a portion of said carrier's path, for maintaining a desired spacing between said each carrier and each other carrier.

9. A material handling apparatus, including:
(a) a pair of substantially vertically oriented and vertically offset drive chains;
(b) an L-shaped bar attached between the drive chains in a manner so that the bar has a substantially vertical portion and a substantially horizontal portion, and so that the chains translate the bar along a path in a substantially vertical plane as the chains rotate, wherein the path includes a pair of vertically offset, generally horizontal elongated portions; and
(c) a carrier suspended from the bar and dimensioned to support at least one component that is place on the carrier, so that said at least one component is translated by the bar and carrier along said path as the chains rotate.

10. A material handling apparatus, including:
(a) a pair of substantially vertically oriented and vertically offset drive chains;
(b) an L-shaped bar attached between the drive chains in a manner so that the bar has a substantially vertical portion and a substantially horizontal portion, and so that the chains translate the bar along a path in a substantially vertical plane as the chains rotate, wherein the path includes a pair of vertically offset, generally horizontal elongated portions;
(c) a carrier suspended from the bar and dimensioned to support at least one component that is placed on the carrier, so that said at least one component is translated by the bar and carrier along said path as the chains rotate; and (d) a first sprocket array associated with each drive chain, each sprocket in the first sprocket array being positioned so as to direct the associated drive chain first upward and then downward along a first deviated chain path portion.

11. The apparatus of claim 10, also including:

(e) a first tank, having an end wall containing fluid, and positioned relative to the carrier and each said first sprocket array such that, when the drive chain translate the carrier past the end wall, the carrier and bar are first lifted upward by the drive chain so that at least one component passes over the end wall, the carrier and bar are then lowered so that said at least one component is at least partially immersed in the fluid.

12. The apparatus of claim 10, also including:

(f) a second sprocket array associated with each drive chain, each second sprocket array being positioned so as to direct the associated drive chain first upward than downward along a second deviated chain path portion; and (g) a second tank, having an end wall, and containing fluid, positioned relative to the carrier and each second sprocket array such that, when the drive chains translate the carrier past the end wall of the second tank, the carrier and bar are first lifted upward by drive chains so that said at least one component passes over the end wall of the second tank, and the carrier and bar are then lowered so that said at least one component is at least partially immersed in the fluid.

13. The apparatus of claim 12, wherein the first tank and second tank are positioned at different vertical positions along the path of said at least one component.

14. The apparatus of claim 13, wherein the first tank and second tank are positioned at substantially the same horizontal position along the path of at least one component.

15. A material handling apparatus, including:

(a) a pair of substantially vertically oriented and vertically offset drive chains;

(b) an L-shaped bar attached between the drive chains in a manner so that the bar has a substantially vertical portion and a substantially horizontal portion, and so that the chains translate the bar along a path in a substantially vertical plane as the chains rotate, wherein the path includes a pair of vertically offset, generally horizontal elongated portions;

(c) a carrier suspended from the bar, wherein the carrier has a basket portion dimensioned to contain at least one encapsulated integrated circuit that is placed on the carrier, so that at least one encapsulated integrated circuit is translated by the bar and carrier along said path as the chains rotate.

16. A material handling apparatus including:

(a) a pair of substantially vertically oriented and vertically offset drive chains;

(b) an L-shaped bar attached between the drive chains in a manner so that the chains translate the bar along a path in a substantially vertical plane as the chains rotate, wherein the path includes a pair of vertically offset, generally horizontal elongated portions, and wherein the bar has a vertical portion attached to one drive chain and a horizontal portion attached to the other drive chain;

(c) a carrier suspended form the bar, wherein the carrier is suspended from the horizontal portion of the bar, and wherein the carrier is dimensioned to support at least one component that is placed on the carrier, so that at least one encapsulated integrated circuit is translated by the bar and carrier along said path as the chains rotate.

17. Electrolytic apparatus, including:

(a) a pair of substantially vertically oriented and vertically offset drive chains;

(b) a rigid L-shaped bar attached between the drive chains in a manner so that the bar has a substantially vertical portion and a substantially horizontal portion, and so that the chains translate the bar along a path in a substantially vertical plane as the chains rotate, wherein the path includes a pair of vertically offset, generally horizontal elongated portions;

(c) a carrier suspended from the bar and having a basket portion dimensioned to support an encapsulated electronic component that is placed in the basket portion, so that the component is translated by the carrier and the bar along said path as the chains rotate;

(d) a sprocket array for each drive chain, each sprocket of each array being engageable with the associated drive chain and each sprocket array being positioned so as to direct the drive chain associated therewith first upward and then downward along a deviated portion of the associated chain path; and (e) a tank, having an end wall and capable of containing fluid, and positioned relative to the carrier and each sprocket array such that, when the drive chains translate the carrier past the end wall, the component is raised over the end wall and is then lowered so as to be at least partially immersed in fluid within the tank.

18. The apparatus of claim 17, wherein the rigid bar has an electrically conductive central portion and two electrically insulating end portions each attached to one of the drive chains, and the carrier has an electrically conductive portion electrically connecting the central portion of the bar and the component, when the component rests in the basket portion, and also including:

(f) at least on electrically conductive stabilizing sprocket attached to the central portion of the bar's central portion;

(g) a third chain for stabilizing the bar, and engaged with said at least one stabilizing sprocket; and (h) an electrical power source coupled to the third chain and capable of causing electric current to flow from the electric power source through at least a portion of the third chain, and through said at least one stabilizing sprocket, the bar's central portion, and the electrically conductive portion of the carrier, to the component when the component rests in the basket portion.

19. The apparatus of claim 18, wherein the basket portion is V-shaped, and has an upper portion having an electrically insulating coating, and an electrically conductive lower portion on which the component may rest.

20. The apparatus of claim 18, wherein the basket portion is U-shaped, and has an upper portion having an electrically insulating coating, and an electrically conductive lower portion on which the component may rest.

21. A material handling apparatus including:
a first drive chain oriented in a substantially vertical plane;
a second drive chain oriented in a substantially vertical plane, and vertically offset from the first chain;
a first carrier supported by the first and second drive chains, and having a first basket portion for receiving a first part, wherein the first drive chain and the second drive chain are capable of rotating so as to translate the first carrier and the first part along a path in a substantially vertical plane, wherein the path includes a pair of vertically offset, generally horizontal elongated portions; and
a first L-shaped member, having a substantially vertical portion and a substantially horizontal portion, a first end directly attached to the first drive chain, and a second end attached to the first carrier.

22. The apparatus of claim 21, also including:
(e) a second rigid member, having a first end attached to the second drive chain, and a second end attached to the first carrier; and
(f) a second carrier translatable by the first and the second drive chains, said second carrier having a second basket portion for receiving a second part, and wherein rotation of the first and the second drive chains will translate the second carrier and the second part along the path.

23. A material handling apparatus, including:
a first drive chain oriented in a substantially vertical plane;
a second drive chain oriented in a substantially vertical plane, and vertically offset form the first chain;
a carrier supported by the first and second drive chains, and having a basket portion for receiving a part, an L-shaped bar portion having a substantially vertical portion connected to the first drive chain and a substantially horizontal portion connected to the second drive chain for supporting the basket portion, and an electrically conductive portion in electrical contact with the part when the part rests in the basket portion, wherein the first drive chain and the second drive chain are connected to the carrier so that when they rotate, they translate the carrier and the part along a path in a substantially vertical plane, wherein the path includes a pair of vertically offset, generally horizontal elongated portions;
at least one electrically conductive stabilizing sprocket attached to the electrically conductive portion of the carrier;
a third chain for stabilizing the bar portion, engaged with said at least one stabilizing sprocket; and
an electric power source coupled to the third chain and capable of causing electric current to flow from the electric power source through at least a portion of the third chain, and through said at least one stabilizing sprocket, and the electrically conductive portion of the carrier, to the part when the part rests in the basket portion.

24. The apparatus of claim 23, also including an electrically conductive bus bar on which the third chain rests, wherein the electric power source is connected to the bus bar, and wherein the third chain comprises at least two electrically insulating links and a plurality of electrically conductive links, so that when one of the electrically conductive links of the third chain is in contact with said at least one stabilizing sprocket, electric current may flow form the electric power source to the bus bar and the part through only a portion of the third chain.

* * * * *